United States Patent [19]

Seidel et al.

[11] Patent Number: 4,848,871
[45] Date of Patent: Jul. 18, 1989

[54] FIBER OPTIC SENSOR FOR DETECTING MECHANICL QUANTITIES

[75] Inventors: Helmut Seidel, Starnberg; Peter Deimel, Langenpreising, both of Fed. Rep. of Germany

[73] Assignee: Messerschmitt-Bölkow-Blohm GmbH, Munich, Fed. Rep. of Germany

[21] Appl. No.: 252,754

[22] Filed: Oct. 3, 1988

[30] Foreign Application Priority Data

Oct. 3, 1987 [DE] Fed. Rep. of Germany ....... 3733549

[51] Int. Cl.⁴ .................... G02B 6/02; G01D 5/34; G01D 5/32
[52] U.S. Cl. .................... 350/96.29; 350/96.10; 350/96.15; 250/227; 250/231 P; 73/653; 73/655; 73/800
[58] Field of Search .......... 350/96.10, 96.15, 96.20, 350/96.29, 96.30; 73/653, 655, 800; 250/227, 231 P

[56] References Cited

U.S. PATENT DOCUMENTS

| 3,045,223 | 7/1962 | Kapany et al. | 250/227 |
| 4,071,753 | 1/1978 | Fulenwider et al. | 250/227 |
| 4,204,742 | 5/1980 | Johnson et al. | 350/96.20 |
| 4,293,188 | 10/1981 | McMahon | 350/96.29 |
| 4,410,020 | 10/1983 | Lorenz | 250/227 X |
| 4,419,895 | 12/1983 | Fuller | 250/227 X |
| 4,421,384 | 12/1983 | McMahon | 350/96.29 |
| 4,518,857 | 5/1985 | McMahon et al. | 73/655 X |
| 4,534,651 | 8/1985 | Minikane | 250/227 X |
| 4,626,680 | 12/1986 | Martens et al. | 250/231 P |
| 4,674,900 | 6/1987 | Erzsébet et al. | 250/227 X |

FOREIGN PATENT DOCUMENTS

| 3230615 | 2/1984 | Fed. Rep. of Germany ... 250/227 X |
| 60-207012 | 10/1985 | Japan | 73/653 |
| 2060165 | 4/1981 | United Kingdom | 350/96.29 |

Primary Examiner—William L. Sikes
Assistant Examiner—Brian M. Healy
Attorney, Agent, or Firm—Kenyon & Kenyon

[57] ABSTRACT

A fiber optic sensor for the detection of mechanical quantities comprising a light source, a first fiber optic waveguide coupled to the light source, the front face of the first waveguide being ground at a 45° angle to the axis of the fiber and mirrored, a second fiber optic waveguide arranged parallel to the first waveguide, the front face of the second waveguide being ground at a 45° angle to the axis of the fiber and mirrored, the two mirrored faces being held opposite to one another, and a photoelement receiver coupled to the other end of the second waveguide. At least one of the waveguides can move either along the fiber axis or around the fiber axis relative to the other waveguide, the motion varying the light received by the receiver and thereby indicating the magnitude of the mechanical quantity.

4 Claims, 4 Drawing Sheets

FIBER OPTIC SENSOR FOR DETECTING MECHANICL QUANTITIES

This invention relates to the field of fiber optic sensors for detecting mechanical quantities. A first fiber optic waveguide is coupled at one end to a light source. A second fiber optic waveguide receives at least part of the light emerging from the first waveguide and directs it to a photoelement. At least one of the waveguides is movable by a mechanical quantity relative to the other waveguide.

BACKGROUND OF THE INVENTION

DE-OS No. 32 30 615 suggests a fiber optic sensor consisting of an elastic fiber optic waveguide with one fixed end, the other end capable of deflection when mechanical forces act thereon. The light emerging from this waveguide is directed onto the face or faces of one or more additional fiber optic waveguides. These waveguides are in turn coupled to a photo sensor. Depending upon the direction of deflection of the first waveguide, the quantity of light received by the additional waveguides varies. The received light is then converted into electrical signals. This sensor is difficult to adjust as the free end of the first waveguide must be moved perpendicularly to the faces of the additional waveguides. Consequently, slight rotation of the sensor or one-sided heat stress can lead to improper displacement of the first fiber optic waveguide.

SUMMARY OF THE INVENTION

It is an object of the present invention to create a fiber sensor which overcomes the limitations of the sensor described in DE-OS No. 32 30 615.

A further object of this invention is to create a sensor which is extremely sensitive to even slight variations in the measured quantity.

To achieve the aforementioned objects, the present invention comprises a fiber optic sensor for detecting mechanical quantities wherein a first fiber optic waveguide is fixedly coupled to a light source and movably coupled to a second fiber optic waveguide, the movement between the two waveguides being caused by the mechanical quantity to be measured. The movable end of the first waveguide is ground at an angle of 45° to the waveguide's axis and then mirrored. The end of the second waveguide is likewise ground at an angle of 45° to its axis and mirrored. The two waveguides are positioned closely parallel to one another with the mirrored faces being opposite to and even with one another. Mechanical displacement along the fiber axis or rotation about the axis of the free end of the first waveguide caused by the mechanical quantity changes the amount of light received by the second waveguide and, consequently, the magnitude of the output signal.

Other and further objects of this invention will become obvious upon an understanding of the illustrative embodiments about to be described with reference to the figures or will be indicated in the appended claims, and further advantages not referred to herein will occur to one skilled in the art upon employment of the invention in practice.

DETAILED DESCRIPTION OF THE INVENTION

Figure 1A:
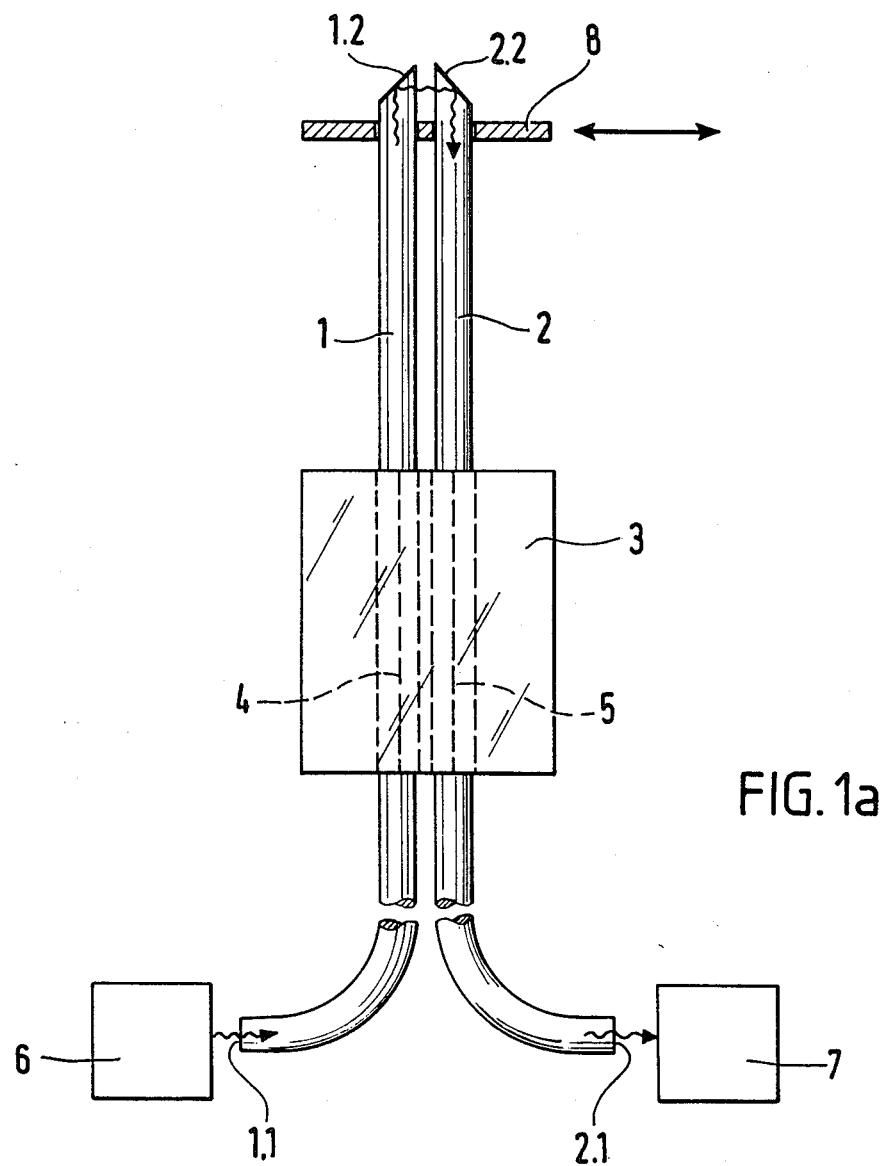
FIG. 1(a) is a perspective view of a first embodiment of the present invention.

As seen in FIG. 1(a), two optic fiber waveguides 1 and 2 are arranged parallel to one another and are fixed in this position by holder 3. Holder 3 consists of monocrystalline silicon into which two parallel V-shaped longitudinal grooves 4 and 5 are created by anisotropic etching. Specific methods for shaping etched grooves in monocrystalline materials are reported in "Spektrum der Wissenschaft", July 1983. On page 41 of the referenced article, a selection of different etched grooves, depicted as a function of the crystal orientation of the silicon surface, is shown in FIG. 4. This reference is hereby incorporated into this specification by the above reference. Fiber optic waveguides 1 and 2 are secured in grooves 4 and 5 by adhesives or by the clamping force applied by a second mirror-image holder with identical longitudinal grooves. Front face 1.1 of waveguide 1 is coupled to electric light source 6. Front face 2.1 of waveguide 2 is coupled to optoelectric receiver 7. The other ends of waveguides 1 and 2, respectively faces 1.2 and 2.2, are ground at a 45° angle relative to the longitudinal axis of the waveguides and mirrored. Faces 1.2 and 2.2 are arranged in the manner of a 90° ridge prism, know in the art, so that light emerges from waveguide 1 via the inside of mirror layer 1.2 at a 90° angle and is directed to the opposing mirror layer 2.2 of waveguide 2. The light thus coupled travels through waveguide 2 and is detected by receiver 7. See FIG. 1(b) for details of this process.

Figure 1B:
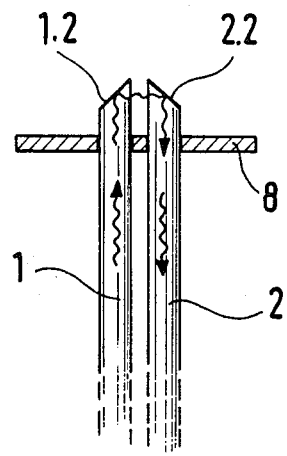
FIG. 1(b) is a detail of the first embodiment of the present invention showing the waveguides in their non-deflected state.
Figure 1C:
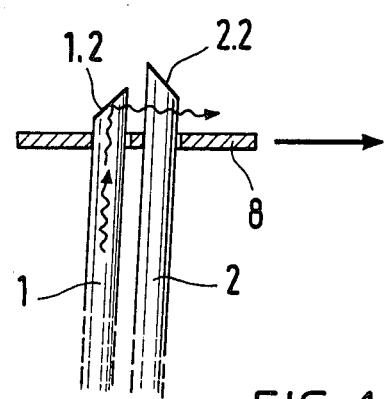
FIG. 1(c) is a detail of the tip of the present invention showing the waveguides in their deflected position.

As shown in FIG. 1(b), waveguide 1 and 2 are connected together near faces 1.2 and 2.2 by means of yoke 8. Yoke 8 has two bores for waveguides 1 and 2 to be led through. At least one of waveguides 1 and 2 is longitudinally displaceable within the associated bore in yoke 8. When yoke 8 is moved by a mechanical quantity perpendicular to the axis of waveguides 1 and 2, both waveguides 1 and 2 are curved in the region between holder 3 and yoke 8, with an offset of faces 1.2 and 2.2 resulting due to the different centers of the radii of curvature. See FIG. 1(c). Depending upon the magnitude of the offset, the quantity of light coupled into waveguide 2 varies. The output signal of receiver 7 varies in a corresponding manner.

If an increase in the mechanical damping of the senor is desired, waveguides 1 and 2 can be enclosed in a damping substance, e.g. silicone rubber, in the region between holder 3 and faces 1.2 and 2.2.

Figure 2:
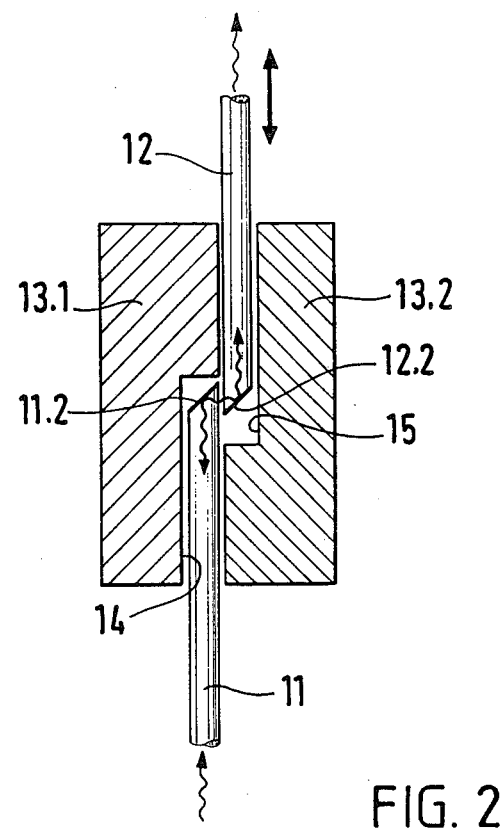
FIG. 2 is a perspective view of a second embodiment of the present invention.

In FIG. 2, waveguides 11 and 12 with mirrored faces 11.2 and 12.2, identical to mirrored faces 1.2 and 2.2, are arranged in holder 13 so that faces 11.2 and 12.2 form the side faces of a parallel plane prism. The coupling of light from waveguide 11 to waveguide 12 is similar to that which occurs between waveguides 1 and 2. Light source 6 is coupled to waveguide 11 and receiver 7 is coupled to waveguide 12.

Holder 13 consists of parts 13.1 and 13.2 into which V-shaped longitudinal grooves 14 and 15 have been created using anisotropic etching. At least one of waveguides 11 and 12 is longitudinally displaceable in grooves 14 and 15, this displacement being influenced by the mechanical quantity. As the displacement of faces 11.2 and 12.2 in the direction of the axes of the fibers is directly proportional to the movement of the waveguide, this arrangement is more sensitive than that shown in FIGS 1(a), (b), and (c), where the deflections of the waveguides due to movement of yoke 8 are relatively small and only increase progressively with increasing deflection.

Figure 3:
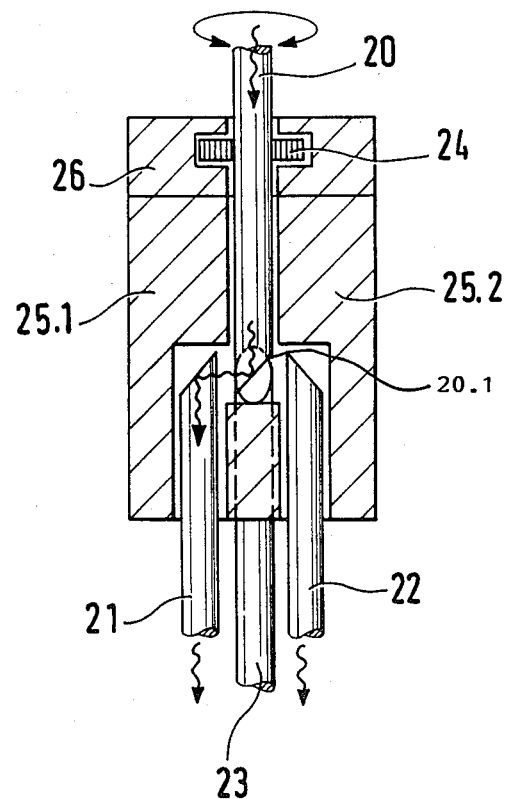
FIG. 3 is a perspective view of a third embodiment of the present invention.

The embodiment of the sensor shown in FIG. 3 can be used to measure rotation about a given axis. Fiber optic waveguide 20 with a mirrored 45 front face 20.1 is coupled to a light source (not shown). Waveguide 20 is surrounded by a plurality of waveguides, here waveguides 21, 22, and 23, each with mirrored 45° front faces, arranged in a manner similar to that shown in FIG. 2. The waveguides are arranged so that rotation of waveguide 20 results in light entering one of the opposed waveguides 21, 22 or 23. In FIG. 3, waveguides 21 and 22 are arranged, with respect to the fiber axis of waveguide 20, exactly opposite to one another. Waveguide 23 is offset by an angle of rotation of 90° with respect to waveguides 21 and 22. To prevent axial displacement of waveguide 20 it is provided with pivot bearing 24 which is held or guided within housing 26. The discrete optic fiber waveguides are then secured in a manner analogous to that used in the previously described embodiments—in V-shaped grooves in the mirror image housing parts 25.1 and 25.2

If only one waveguide 21, 22, or 23 is used, rotational motions of waveguide 20 in the range of ±90° from the position of maximum coupled light intensity can be measured. The use of two waveguides, here 21 and 22, increases the range to ±180°. If a third waveguide, here 23, is used, the direction of rotation can also be determined in a known manner.

As many apparently widely different embodiments of this invention may be made without departing from the spirit and scope thereof, it is to be understood that the invention is not limited to the specific embodiments thereof except as defined in the appended claims.

What is claimed is:

1. A fiber optic sensor for detecting mechanical quantities comprising
   light source means;
   first fiber optic waveguide means, the first end of the first waveguide means being coupled to the light source means, the other end of the first waveguide having a front face ground to a 45° angle relative to the fiber axis, the front face being mirrored; and
   second fiber optic waveguide means, the first end of the second waveguide means having a front face ground to a 45° angle relative to the fiber axis, the front face being mirrored, and the second end of the second waveguide means being coupled to a photoelement receiver means, wherein the first and second waveguide means are arranged parallel to one another with their respective front faces opposite to one another and closely adjacent, at least one of the waveguide means being movable relative to the other when acted upon by the mechanical quantity so that light transmitted by the light source means travels through the first waveguide means and is received by the second waveguide means at varying intensity levels dependent upon the relative motion of the waveguides, the second waveguide means transmitting the light to the receiver means, the varying light intensity being converted therein to an electrical signal which indicates the magnitude of the motion along or about the fiber axis.

2. The sensor according to claim 1 wherein the waveguide means are held in parallel alignment by a holder having V-shaped longitudinal grooves etched therein, within which grooves the waveguide means are placed.

3. The sensor according to claim 2 wherein one waveguide means can be displaced along the fiber axis when placed within the V-shaped grooves etched in the holder.

4. The sensor according to claim 1 wherein the waveguide means are arranged with their front faces in the same direction, the ends being held at a constant distance apart from one another by a yoke with two bores, the waveguides being placed within the bores, the yoke being displaceable perpendicularly to the fiber axis by the mechanical quantity.

* * * * *